United States Patent
Matamoros

(10) Patent No.: US 10,198,019 B2
(45) Date of Patent: Feb. 5, 2019

(54) METHOD AND APPARATUS FOR SEQUENCE OF EVENT LOGGING BY A POWER CONDITIONER

(71) Applicant: Enphase Energy, Inc., Petaluma, CA (US)

(72) Inventor: Joseph Phillips Matamoros, San Francisco, CA (US)

(73) Assignee: Enphase Energy, Inc., Petaluma, CA (US)

( * ) Notice: Subject to any disclaimer, the term of this patent is extended or adjusted under 35 U.S.C. 154(b) by 118 days.

(21) Appl. No.: 15/292,912

(22) Filed: Oct. 13, 2016

(65) Prior Publication Data
US 2017/0108909 A1    Apr. 20, 2017

Related U.S. Application Data

(60) Provisional application No. 62/241,365, filed on Oct. 14, 2015.

(51) Int. Cl.
*G05F 1/66* (2006.01)
*H02H 1/00* (2006.01)
(Continued)

(52) U.S. Cl.
CPC ............... *G05F 1/66* (2013.01); *G06F 17/50* (2013.01); *G06F 17/5004* (2013.01);
(Continued)

(58) Field of Classification Search
CPC ...... G06F 17/50; G06F 17/5004; G06F 21/60; G06F 2217/02; G06F 2217/78;
(Continued)

(56) References Cited

U.S. PATENT DOCUMENTS

2006/0029105 A1* 2/2006 Kasztenny .......... H02J 13/0013
370/503
2009/0150686 A1* 6/2009 Muthu-Manivannan ...................
H02H 3/04
713/300
(Continued)

FOREIGN PATENT DOCUMENTS

| EP | 2725372 A1 | 4/2014 |
| KR | 101147806 B1 | 5/2012 |
| WO | WO-2012027147 A2 | 3/2012 |

OTHER PUBLICATIONS

"FAQs-MICRO", ABB, http://www.abb.fr/product/seitp322/c22e40a137ca782b85257cc900533f17.aspx.
(Continued)

*Primary Examiner* — Terrell S Johnson
(74) *Attorney, Agent, or Firm* — Moser Taboada

(57) ABSTRACT

A method and apparatus for sequence of event (SOE) data logging. In one embodiment, the method comprises continuously recording, at a power conditioner coupled to a power distribution line, data obtained by sampling a waveform of the power distribution line during a sampling window; analyzing, by the power conditioner, the data to determine whether an event has occurred; and based on the analysis, maintaining the data when it is determined that the event has occurred, and discarding the data when it is determined that the event has not occurred.

17 Claims, 6 Drawing Sheets

(51) Int. Cl.
  *G06F 17/50* (2006.01)
  *G06F 21/60* (2013.01)
  *H02J 13/00* (2006.01)

(52) U.S. Cl.
  CPC .......... *G06F 21/60* (2013.01); *G06F 2217/02* (2013.01); *G06F 2217/78* (2013.01); *H02H 1/0053* (2013.01); *H02J 13/0013* (2013.01); *H02J 13/0055* (2013.01); *H02J 13/0086* (2013.01)

(58) Field of Classification Search
  CPC ................ H02H 1/0053; H02J 13/0013; H02J 13/0055; H02J 13/0086
  See application file for complete search history.

(56) References Cited

U.S. PATENT DOCUMENTS

| | | |
|---|---|---|
| 2012/0212064 A1 | 8/2012 | Spanoche et al. |
| 2014/0191583 A1 | 7/2014 | Chisenga et al. |
| 2014/0266289 A1 | 9/2014 | Della et al. |
| 2015/0054523 A1 | 2/2015 | Perkinson |

OTHER PUBLICATIONS

"SEL Disturbance Recording System", Schweitzer Engineering Laboratories, Inc.

\* cited by examiner

METHOD AND APPARATUS FOR SEQUENCE OF EVENT LOGGING BY A POWER CONDITIONER

CROSS-REFERENCE TO RELATED APPLICATIONS

This application claims benefit of U.S. provisional patent application Ser. No. 62/241,365, entitled "Distributed Sequence of Event Logging by Network of Microinverters", and filed Oct. 14, 2015, which is herein incorporated in its entirety by reference.

BACKGROUND OF THE INVENTION

Field of the Invention

Embodiments of the present disclosure relate generally to sequence of event logging, and, in particular, sequence of event logging by power converters.

Description of the Related Art

A Sequence of Events (SOE) recorder is a device that can capture digital and analog signals at a waveform level when triggered by a particular condition, event or variable. These recorders are used in utility applications to record measured data during transient conditions. These recorders were developed when capabilities to measure, analyze, communicate and record waveform data were limited and expensive. These technical and economic factors limited applications principally to central installations like large generator and substation applications. Measured variables are typically provided by physical connection to instrument transformers or connection to relays/RTUs (remote terminal units), and the measured variables, sampling rates and sampling period are typically configurable to optimize available memory and sampling rates of the recording device. Typical utility meters do not have the sampling rate, memory, or advanced metering infrastructure (AMI) connection to provide SOE capabilities at the customer endpoint edge of the grid.

Therefore, there is a need in the art for a method and apparatus for SOE logging of waveform data and managing resulting data at the customer edge of the power grid.

SUMMARY OF THE INVENTION

Embodiments of the present invention generally relate to a method and apparatus for sequence of event logging by a power conditioner substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
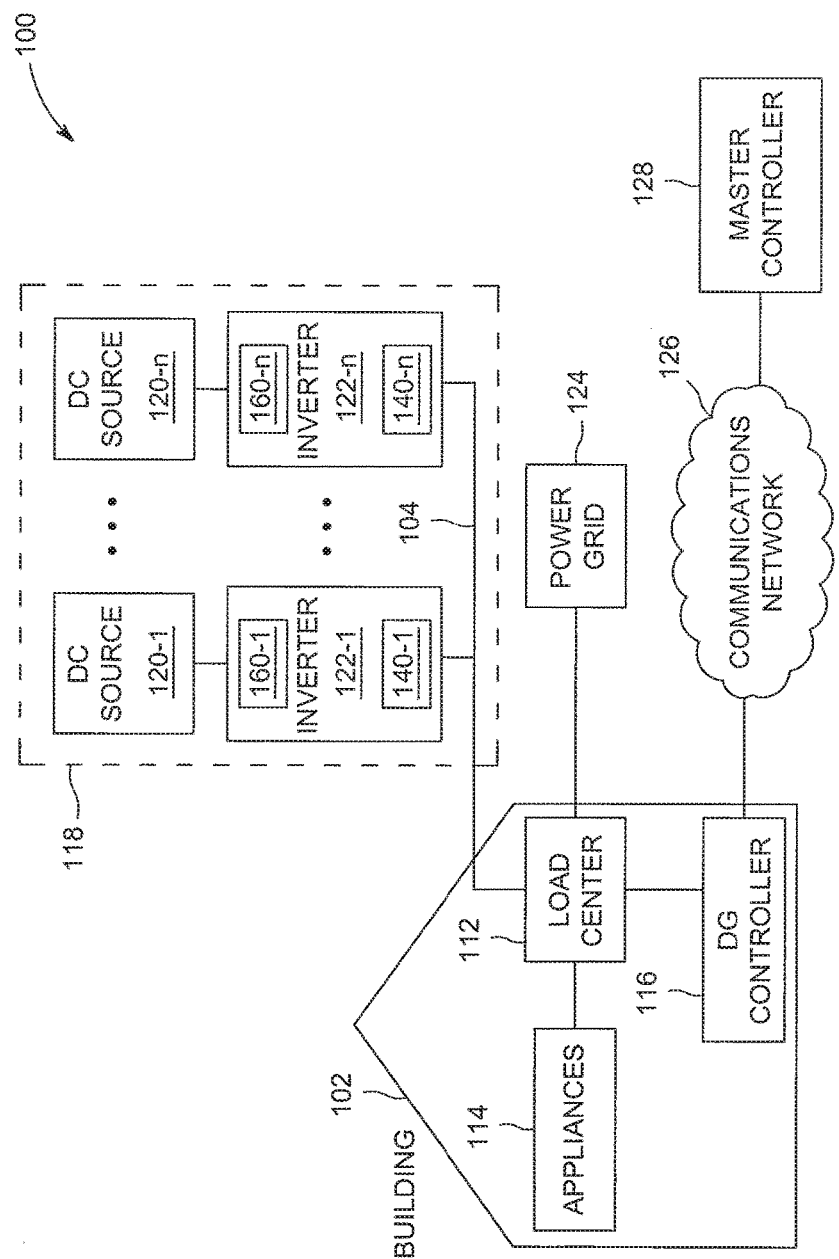
FIG. 1 is a block diagram of a system employing sequence of event logging in accordance with one or more embodiments of the present invention.

FIG. 1 is a block diagram of a system 100 employing sequence of event logging by power conditioners in accordance with one or more embodiments of the present invention. This diagram only portrays one variation of the myriad of possible system configurations. The present invention can function in a variety of environments and systems.

The system 100 comprises a building 102, such as a residential or commercial building, coupled to a distributed generator (DG) 118 and a larger power grid 124, such as a commercial power grid. The building 102 comprises a load center 112, one or more appliances 114, and a DG controller 116. Each of the power grid 124, the appliances 114, the DG controller 116, and the DG 118 are coupled to one another via the load center 112.

The DG system 118 comprises a plurality of DC sources 120-1 through 120-N (collectively referred to as DC sources 120) coupled to a plurality of inverters 122-1 through 122-N (collectively referred to as inverters 122) in a one-to-one correspondence. The DC sources 120 may be any type of system or device for generating DC power, such as a renewable energy system (e.g., wind, solar, hydro, or the like), batteries, or the like. In one or more particular embodiments, the DC sources 120 are photovoltaic (PV) modules. In some alternative embodiments, the DG 118 may comprise multiple DC sources 120 coupled to a single inverter 122 (i.e., a single centralized inverter).

The inverters 122 convert the generated DC power to AC power that is power grid compliant and couple the AC power to the load center 112 via an AC bus 104. The generated AC power may be further coupled from the load center 112 to the one or more appliances 114 and/or to the power grid 124. Additionally or alternatively, generated energy may be stored for later use; for example, the generated energy may be stored utilizing batteries, heated water, hydro pumping, $H_2O$-to-hydrogen conversion, or the like.

Each of the inverters 122-1 through 122-N comprises a corresponding waveform monitor 140-1 through 140-N, respectively, for monitoring (i.e., sampling) one or more waveforms at the output of the corresponding inverter 122. In some embodiments each of the waveform monitors 140-1 through 140-N (collectively referred to as waveform monitors 140) monitors the AC voltage of the AC power distribution line at the inverter output, while in other embodiments each of the waveform monitors 140 additionally or alternatively monitors the AC current at the inverter output. Additionally, each of the inverters 122-1 through 122-N comprises an inverter controller 160-1 through 160-N (collectively referred to as inverter controllers 160) for controlling operation of the corresponding inverter 122. The inverter controller 160 is described in detail below with respect to FIG. 3.

Although the DG 118 comprises DC-AC inverters 122 for generating an AC output, in some alternative embodiments the DG 118 may comprise other types of power conditioners in place of the DC-AC inverters 122. For example, in some other embodiments the power conditioners may be AC-AC power conditioners.

The DG controller 116 provides operational control of the inverters 122. In some embodiments, the DG controller 116 provides such control utilizing power line communication (PLC) to communicate with the inverters 122 via the AC bus 104; additionally or alternatively, the DG controller 116 may utilize other types of wired and/or wireless techniques for communicating with the inverters 122.

The DG controller 116 is further communicatively coupled to a master controller 128 via a communications network 126 (e.g., the Internet) for sending information to/receiving information from the master control 128. The DG controller 116 may utilize wired and/or wireless techniques for coupling to the communications network 126; in some embodiments, the DG controller 116 may be coupled to the communications network 126 via a commercially available router.

Figure 2:
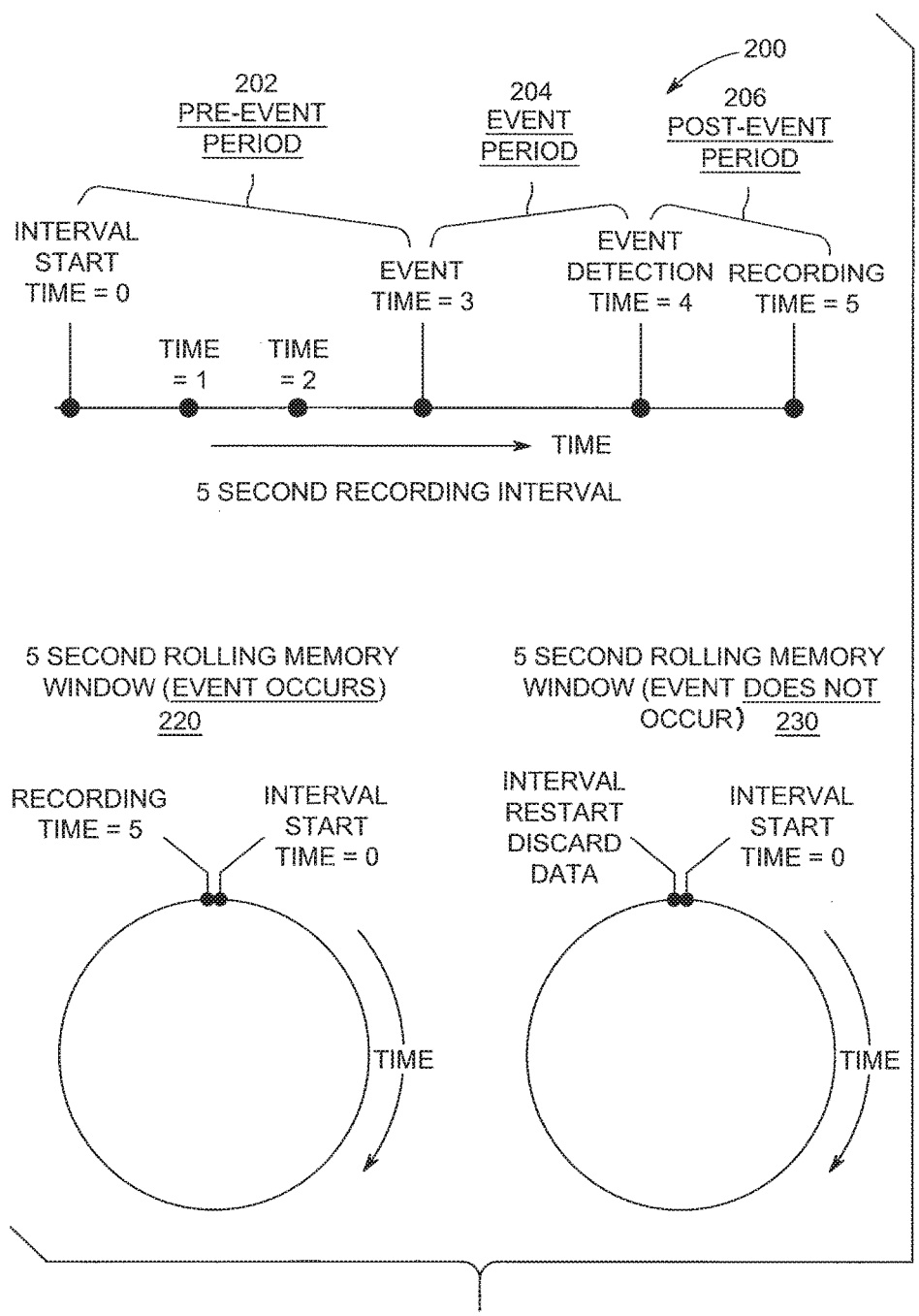
FIG. 2 depicts a representation of an SOE event data time window and rolling memory depictions in accordance with one or more embodiments of the present invention.

In accordance with one or more embodiments of the present invention, the inverters 122 each employ SOE logging and analysis as described herein. Each inverter 122 continuously samples waveform data and records a rolling window of sampled waveform data. The recorded data during a sampling window is analyzed, and, when triggered by an event such as a particular fault or grid condition, the recorded information in the sampling window—i.e., the data during a period prior to the trigger, the data during the event period, and the data during a period following the event period—is stored. FIG. 2, described below, outlines the concept of the rolling memory and sampling window according to one particular embodiment.

The data during a sampling window during which an event occurs (i.e., the pre-, during, and post-event periods) is stored in the corresponding inverter 122; additionally or alternatively, the data may be sent to the DG controller 116 and/or the master controller 128 to be stored. The frequency of events having certain signatures and the like can then be determined; for example, the number of voltage sags of a certain signature indicative of stalled motors can be determined to aid in power quality assurance activities. Event data can be examined within the inverters 122, the DG controller 116, and/or the master controller (128).

During power conversion, each of the inverters 122 (i.e., the corresponding waveform monitors 140) measures (samples) the AC waveform on the AC bus 104 at a sampling rate of, for example, 512 samples/second. Each inverter 122 constantly records the sampled data throughout the sampling window time period (for example, 15 seconds) and analyzes such data for any events—i.e., one or more of anomalies, faults, grid conditions, and the like. If it is determined that no events are present, the recorded time period of data is deleted (or overwritten). If it is determined that an event is present, the recorded time period of data, which includes any data during the sampling window that occurred prior to the event, is maintained. Additionally, sampled data for a period of time following the anomaly is maintained. Such a data snapshot of SOE event data provides both pre- and post-event data. In some embodiments, a 6-second rolling window is used to record the last 3 seconds and the next 3 seconds; if an anomaly occurs, a "snapshot" of that window is obtained. In other embodiments, an adjustable longer or shorter rolling window and/or higher or lower sampling rate may be used depending on the application and memory capabilities. FIG. 2, described below, outlines one embodiment of the concept of the rolling memory and sampling window.

Recorded SOE event data may be stamped with identification information including one or more of time stamp information, utility phase information, physical location information, system information (e.g., inverter serial number), or the like.

The SOE event data obtained by the inverters 122 may be communicated to the DG controller 116, for example using power line communications. The DG controller 116 may perform further analysis on the data received from each of the inverters 122, and/or communicate the received data and/or results of further analysis to the master controller 128. In some embodiments, the inverters 122, the DG controller 116, and/or the master controller 128 may perform one or more operations based on the SOE event data. For example, the DG controller 116 may analyze the SOE event data obtained from the inverters 122 and send one or more control instructions to the inverters 122 based on the result of the analysis (e.g., turning of one or more of the inverters 122).

In addition to the SOE data logging and stamping described above, one or more techniques for pattern recognition, grouping by physical location (or other criteria such as phase connection), and the like may be employed to augment this core functionality and reduce notifications for normal transient activities (such as single phase motor starts). For example, data from buildings 102 at various locations may be coordinated and analyzed (for example, at the master controller 128) for identifying whether an event occurred at only a single location or at multiple locations, e.g., as a result of a utility system problem impacting multiple services or a fault isolated to a single building. Further, one or more analysis techniques may be used with respect to the combination of recorded events by the inverters 122 on the same phase/facility to avoid duplicated reporting of SOE event data or overlap waveforms from the different devices to detect issues within one device signal. Furthermore, SOE event data can be used to detect and assess electrical motor stalls, flicker conditions, fault conditions, and similar conditions which could impact the AC voltage waveform.

Such SOE logging and analysis can be used for improving power quality, resolving fault for transient events, detecting potential asset problems such as faults, stalled motors, failing utility equipment, and the like.

The techniques described herein would enable a utility to have a continuous and adjustable SOE recorder deployed at every DG location utilizing this feature. This resource could detect latent, chronic or underreported power quality (PQ) problems related to the grid requiring attention (e.g., system problems on the network secondary) and help to diagnose potential power quality (PQ) issues that are actually related to customer load activity and not grid regulation. This would provide additional grid monitoring value and help resolve which load/source might be at fault on a common secondary behind the utility point of common coupling (PCC).

FIG. 2 depicts a representation of an SOE event data time window 210 and rolling memory depictions 220 and 230 in accordance with one or more embodiments of the present invention.

The SOE event data time window 210 comprises a pre-event period 202, an event period 204, and a post-event period 206. The SOE event data time window 210 begins at time T=0 when data sampling and analysis for any events begins. From time T=0 to T=3 seconds, which is the pre-event period 202, no anomalies are found. From time T=3 seconds to time T=4 seconds, which is the event period 204, an event is identified during the analysis of the sampled data. From time T=4 seconds to time T=5 seconds, which is the post-event period 206, no events are identified. As a result of the event occurring during the event period 204, the data during the entire time window T=0 through T=5 seconds (i.e., the data during the pre-event period 202, the event period 204, and the post-event period 206) is stored.

In other embodiments, the lengths of one or more of the pre-event period 202, the event period 204, and the post-event period 206 may differ from those depicted in FIG. 2. In certain embodiments, the lengths of one or both of the pre-event period 202 and the post-event period 206 may be variable, e.g., a user may be able to set the length of one or both periods.

The rolling memory depiction 220 provides a visual portrayal of the concept of a five-second rolling memory window when an event is detected during the data sampling window. As shown on the rolling memory depiction 220, the interval start time is at time=0 seconds. At time=5 seconds, the data occurring during the five-second recorded window is stored.

The rolling memory depiction 230 provides a visual portrayal of the concept of a five-second rolling memory window when an event is not detected during the data sampling window. As shown on the rolling memory depiction 230, the interval start time is at time=0 seconds. At time=5 seconds, the data occurring during the five-second recorded window is discarded (e.g., deleted or overwritten).

Figure 3:
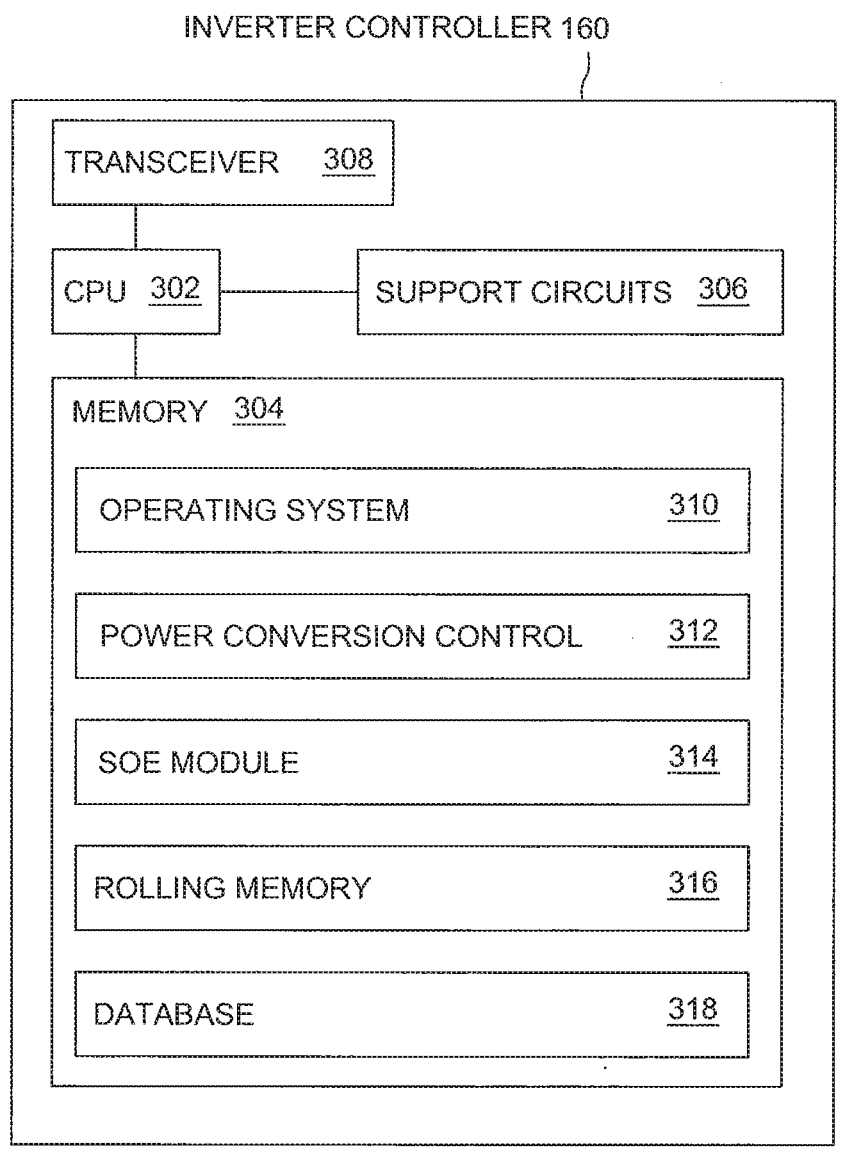
FIG. 3 is a block diagram of an inverter controller in accordance with one or more embodiments of the present invention.

FIG. 3 is a block diagram of an inverter controller 160 in accordance with one or more embodiments of the present invention. The inverter controller 160 comprises at least one central processing unit (CPU) 302 coupled to each of a memory 304, support circuits 306 (i.e., well known circuits used to promote functionality of the CPU 302), and a transceiver 308 that is communicatively coupled to the DG controller 116. The CPU 302 may comprise one or more conventionally available microprocessors or microcontrollers. The inverter controller 160 may be implemented using a general purpose computer that, when executing particular software, becomes a specific purpose computer for performing various embodiments of the present invention. In one or more embodiments, the CPU 302 may be a microcontroller comprising internal memory for storing controller firmware that, when executed, provides the controller functionality described herein.

The support circuits 306 are well known circuits used to promote functionality of the CPU 302. Such circuits include, but are not limited to, a cache, power supplies, clock circuits, buses, input/output (I/O) circuits, and the like.

The memory 304 may comprise random access memory, read only memory, removable disk memory, flash memory, and various combinations of these types of memory; the memory 304 is sometimes referred to as main memory and may, in part, be used as cache memory or buffer memory. The memory 304 generally stores an operating system (OS) 310, such as one of a number of available operating systems for microcontrollers and/or microprocessors (e.g., LINUX, Real-Time Operating System (RTOS), and the like). The memory 304 further stores non-transient processor-executable instructions and/or data that may be executed by and/or used by the CPU 302. These processor-executable instructions may comprise firmware, software, and the like, or some combination thereof.

The memory 304 stores various forms of application software, such as a power conversion control module 312 for controlling power conversion by the inverter 122, and an SOE module 314 for performing the SOE logging functions described here.

The memory 304 comprises a rolling memory portion 316 for recording sampled data during a rolling SOE sampling window as described herein. The memory 304 additionally stores a database 318 for storing data related to the operation of the inverter 122 as well as, in some embodiments, the stored SOE event data. In various embodiments, the power conversion control module 312, the SOE module 314, the rolling memory portion 316, and the database 318, or portions thereof, may be implemented in software, firmware, hardware, or a combination thereof.

In some embodiments, each inverter controller 160 may additionally or alternatively comprise one or more application specific integrated circuits (ASIC) for performing one or more of the functions described herein.

Figure 4:
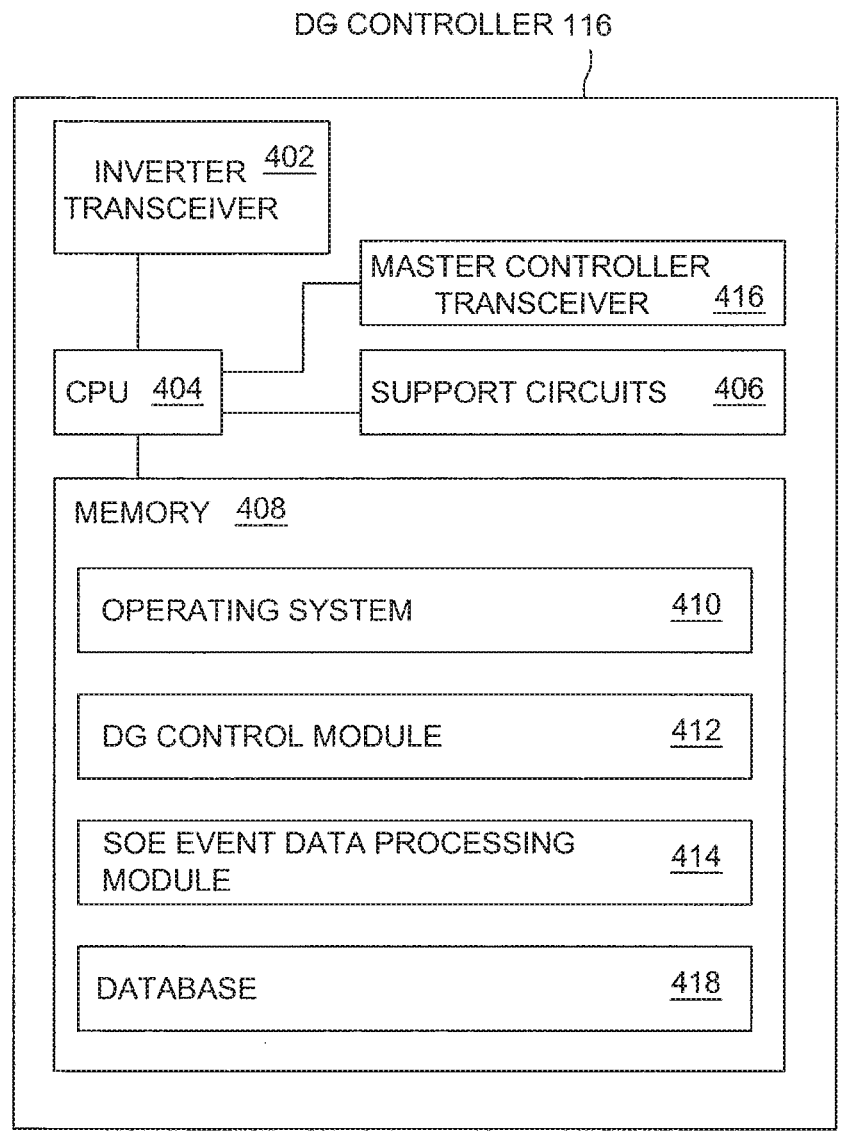
FIG. 4 is a block diagram of a DG controller in accordance with one or more embodiments of the present invention.

FIG. 4 is a block diagram of a DG controller 116 in accordance with one or more embodiments of the present invention. The DG controller 116 comprises a master controller transceiver 416 communicatively coupled to the master controller 128 via the communications network 126, and an inverter transceiver 402 communicatively coupled to the inverters 122. The transceivers 402 and 416 may utilize wireless (e.g., based on standards such as IEEE 802.11, Zigbee, Z-wave, or the like) and/or wired (e.g., PLC) communication techniques for such communication, for example a WI-FI or WI-MAX modem, 3G modem, cable modem, Digital Subscriber Line (DSL), fiber optic, or similar type of technology.

The DG controller 116 further comprises at least one central processing unit (CPU) 404 coupled to each of the inverter transceiver 402, the master controller transceiver 416, support circuits 406, and a memory 408. The CPU 204 may comprise one or more conventionally available microprocessors; additionally or alternatively, the CPU 404 may include one or more application specific integrated circuits (ASICs). In some embodiments, the CPU 404 may be a microcontroller comprising internal memory for storing controller firmware that, when executed, provides the controller functionality herein. The DG controller 116 may be implemented using a general purpose computer that, when executing particular software, becomes a specific purpose computer for performing various embodiments of the present invention.

The support circuits 406 are well known circuits used to promote functionality of the CPU 204. Such circuits include, but are not limited to, a cache, power supplies, clock circuits, buses, network cards, input/output (I/O) circuits, and the like.

The memory 408 may comprise random access memory, read only memory, removable disk memory, flash memory, and various combinations of these types of memory. The memory 408 is sometimes referred to as main memory and may, in part, be used as cache memory or buffer memory. The memory 408 generally stores an operating system (OS) 410 of the DG controller 116. The OS 410 may be one of a number of available operating systems for microcontrollers and/or microprocessors.

The memory 408 stores various forms of application software, such as a DG control module 412 for providing operative control of the DG 118 (e.g., providing command instructions to the inverters 122 regarding power production levels). The memory 408 further comprises an SOE event data processing module 414 for processing SOE event data received from the DG 118. In one or more embodiments, each of the inverters 122 transmits the SOE event data to the DG controller 116, for example at regularly scheduled time intervals or as the data occurs, and the like.

The SOE event data processing module 414 performs various analyses on the received SOE event data, such as pattern recognition, grouping by physical location (or other criteria such as phase connection), correlation of events, and the like. In some embodiments the SOE event data processing module 414 may additionally stamp the received SOE event data and/or results from analysis of SOE event data with identification information indicating, for example, a location (such as GPS coordinates and/or other information identifying the location of the DG 118, the building 102, or the like), one or more particular DG components (such as serial numbers of inverters 122 reporting the SOE event data), and the like. The DG controller 116 may send SOE event data and/or data resulting from the analysis of the SOE event data to the master controller 128.

The memory 408 may also store a database 418 for storing data related to the operation of the inverters 122 and/or the present invention, such as SOE event data analysis results and information.

Figure 5:
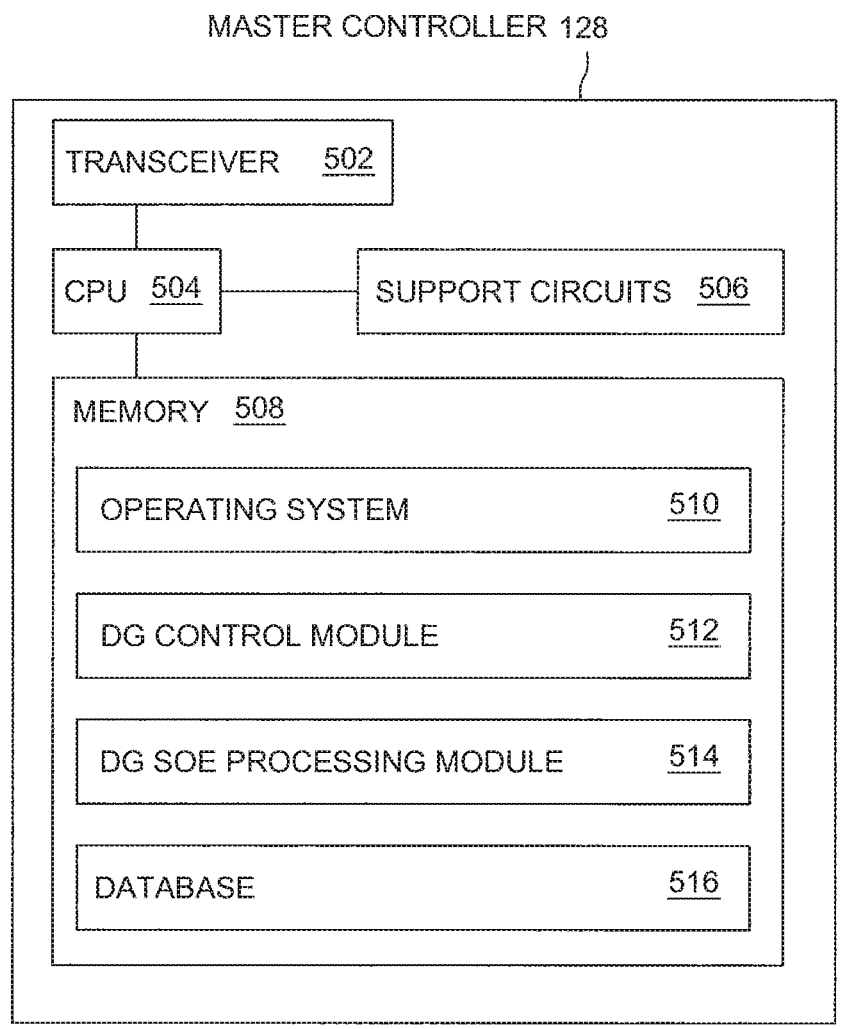
FIG. 5 is a block diagram of a master controller in accordance with one or more embodiments of the present invention.

FIG. 5 is a block diagram of a master controller 128 in accordance with one or more embodiments of the present invention. The master controller 128 comprises a transceiver 502 communicatively coupled to DG controller 116 via the communications network 126. The transceiver 502 may utilize wireless (e.g., based on standards such as IEEE 802.11, Zigbee, Z-wave, or the like) and/or wired communication techniques for such communication, for example a WI-FI or WI-MAX modem, 3G modem, cable modem, Digital Subscriber Line (DSL), fiber optic, PLC, or similar type of technology.

The master controller 128 further comprises at least one central processing unit (CPU) 504 coupled to each of the transceiver 502, support circuits 506, and a memory 508. The CPU 504 may comprise one or more conventionally available microprocessors; additionally or alternatively, the CPU 504 may include one or more application specific integrated circuits (ASICs). In some embodiments, the CPU 504 may be a microcontroller comprising internal memory for storing controller firmware that, when executed, provides the controller functionality herein. The master controller 128 may be implemented using a general purpose computer that, when executing particular software, becomes a specific purpose computer for performing various embodiments of the present invention.

The support circuits 506 are well known circuits used to promote functionality of the CPU 504. Such circuits include, but are not limited to, a cache, power supplies, clock circuits, buses, network cards, input/output (I/O) circuits, and the like.

The memory 508 may comprise random access memory, read only memory, removable disk memory, flash memory, and various combinations of these types of memory. The memory 508 is sometimes referred to as main memory and may, in part, be used as cache memory or buffer memory. The memory 508 generally stores an operating system (OS) 510 of the master controller 128. The OS 510 may be one of a number of available operating systems for microcontrollers and/or microprocessors.

The memory 508 stores various forms of application software, such as a DG control module 512 for providing operative control of the DG 118 (e.g., providing command instructions to the DG controller 116 regarding power production levels) and, in some embodiments, additional DGs. The memory 508 further comprises a DG SOE processing module 514 for performing various analyses on the SOE-related data received, such as pattern recognition, grouping by physical location (or other criteria such as phase connection), correlation of events, and the like. In some embodiments the DG SOE processing module 514 may additionally stamp the received data and/or results from analysis of the data with identification information indicating, for example, a location (such as GPS coordinates and/or other information identifying the location of the DG 118, the building 102, or the like), one or more particular DGs, one or more particular DG components (such as serial numbers of inverters 122 reporting the SOE event data), and the like.

The memory 508 additionally stores a database 516 for storing data, such as data related to the operation of the DGs 118, data from analysis performed on the SOE-related data, and the like.

Figure 6:
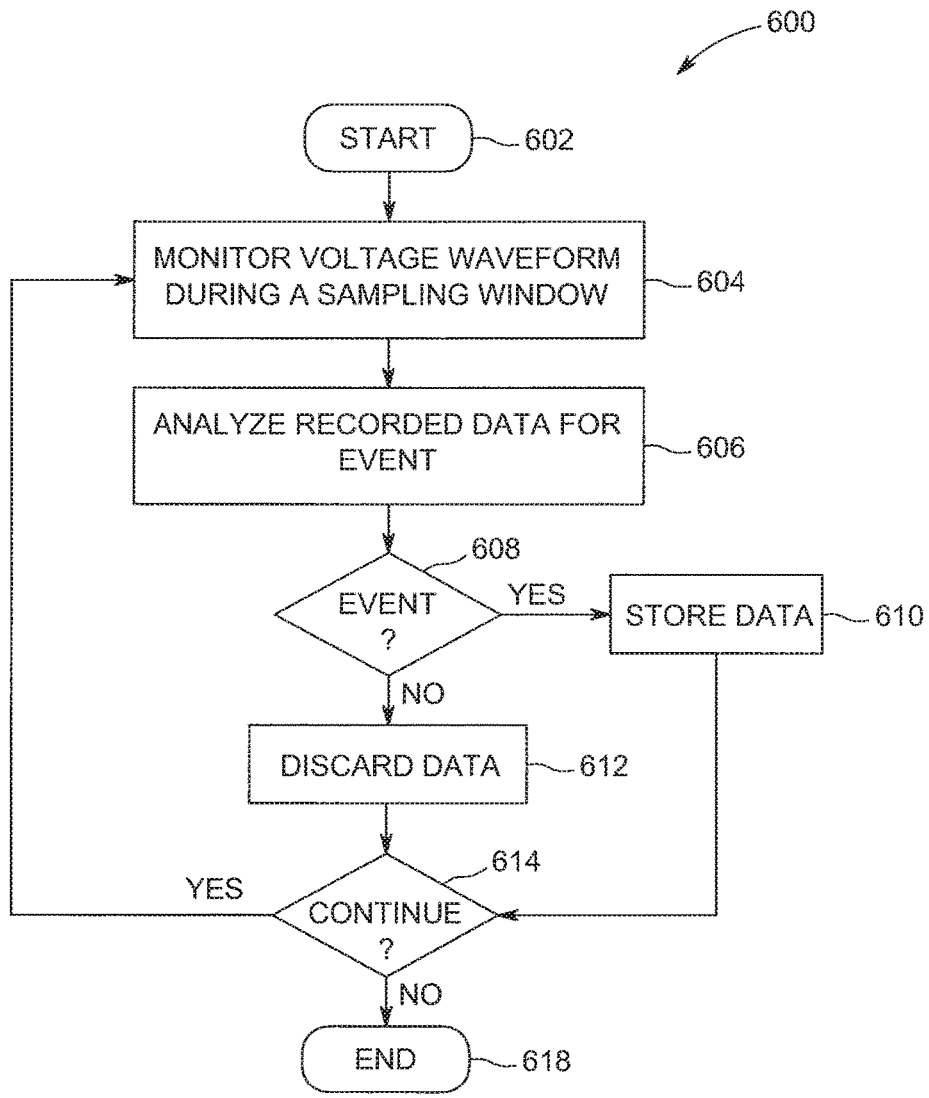
FIG. 6 is a block diagram of a method for SOE logging and analysis by a power conditioner in accordance with one or more embodiments of the present invention.

FIG. 6 is a block diagram of a method 600 for SOE logging and analysis by a power conditioner in accordance with one or more embodiments of the present invention. In some embodiments, such as the embodiment described below, the power conditioner is a DC-AC inverter that is part of a DG and is coupled to a larger power grid via an AC bus (e.g., the inverters 122 of the DG 118). In other embodiments, the power conditioner is another type of power conditioner, such as a DC-DC power conditioner or an AC-AC power conditioner that is coupled to a power distribution system line.

In one or more embodiments, the method 600 is an implementation of the SOE module 314. In some embodiments, a computer readable medium comprises a program that, when executed by a processor, performs the method 600 that is described in detail below.

The method 600 starts at step 602 and proceeds to step 604. At step 604, a voltage monitor of the inverter monitors (i.e., samples) the AC voltage waveform at the inverter output on the AC bus and continuously records the sampled data during a sampling window. The sampling window is a rolling time window on the order of, for example, 15 seconds, during which the voltage waveform may be sampled at a rate of, for example, 512 samples/second. In certain embodiments, the length of the sampling window and/or the sampling rate may be set to a fixed predetermined value, while in other embodiments one or both may be adjustable (e.g., by a user).

In some alternative embodiments, other waveforms may additionally or alternatively be monitored by the inverter, such as the AC current waveform on the AC bus or the AC power on the AC bus. In still other alternative embodiments, a fixed time window may be used for data sampling rather than a rolling time window.

The method 600 proceeds to step 606 where the recorded data is analyzed for an event. An event comprises one or more of a waveform anomaly, a particular fault, particular grid conditions, or the like. The data may be analyzed as it is sampled and/or after a certain period of data has been collected.

At step 608, a determination is made based on the data analysis in step 606 whether an event occurred during the sampling window. If the result of the determination is yes, an event has occurred, the method 600 proceeds to step 610.

At step 610, the data during the time period in which the event occurred is saved, along with the data during a pre-event time period. Additionally, data sampled following the event is also saved. The data being stored may be stamped with identification information, such as a timestamp, utility phase information, physical location information, system information (e.g., inverter serial number), and the like. The data may be stamped when it is initially sampled, when it is analyzed, or when it's stored. The SOE event data may be stored at the inverter; additionally or alternatively, the SOE event data may be sent to a system controller (e.g., the DG controller 116 and/or the master controller 128) for storage. The method 600 proceeds from step 610 to step 614.

If, at step 608, the result of the determination is no, that no events occurred during the sampling window, the method 600 proceeds to step 612 where the recorded data is discarded (e.g., deleted or overwritten). The method 600 proceeds to step 614.

At step 614, a determination is made whether to continue. If the result of the determination is yes, the method 600 returns to step 604 where the sampling window restarts. If the result of the determination is no, the method 600 proceeds to step 618 where it ends.

The stored SOE event data may be communicated from the power conditioner to a system controller, such as the DG controller 116 and/or the master controller 128. The system controller may perform further analysis on the SOE event data, for example the system controller may correlate event data from multiple power conditioners or from multiple DGs for determining a root cause of one or more events.

The results of analysis by one or more of the inverter, a local system controller (e.g., the DG controller 116) and a remote system controller (e.g., the master controller 128) may be communicated to a system user, such as the owner of a DG, a utility manager, or the like.

While the foregoing is directed to embodiments of the present invention, other and further embodiments of the invention may be devised without departing from the basic scope thereof, and the scope thereof is defined by the claims that follow.

The invention claimed is:

1. A method for sequence of event (SOE) data logging, comprising:
    continuously recording, at a power conditioner coupled to a power distribution line, data obtained by sampling a waveform of the power distribution line during a sampling window;
    analyzing, by the power conditioner, the data to determine whether an event has occurred; and
    based on the analysis, maintaining the data when it is determined that the event has occurred, and discarding the data when it is determined that the event has not occurred, wherein the power conditioner is a DC-AC inverter.

2. The method of claim 1, wherein the sampling window is a rolling window.

3. The method of claim 2, wherein the data comprises (i) data obtained during a time period prior to the event, and (ii) data obtained during a time period following the event.

4. The method of claim 1, further comprising stamping the data with identification information.

5. The method of claim 4, wherein the identification information comprises at least one of a time stamp, phase information, or physical location.

6. An apparatus for sequence of event (SOE) data logging, comprising:
    a power conditioner, coupled to a power distribution line, comprising a controller for (i) continuously recording data obtained by sampling a waveform of the power distribution line during a sampling window; (ii) analyzing the data to determine whether an event has occurred; and (iii) maintaining the data when it is determined that the event has occurred, and discarding the data when it is determined that the event has not occurred, wherein the power conditioner is a DC-AC inverter.

7. The apparatus of claim 6, wherein the sampling window is a rolling window.

8. The apparatus of claim 7, wherein the data comprises (a) data obtained during a time period prior to the event, and (b) data obtained during a time period following the event.

9. The apparatus of claim 6, wherein the controller further stamps the data with identification information.

10. The apparatus of claim 9, wherein the identification information comprises at least one of a time stamp, phase information, or physical location.

11. A system for sequence of event (SOE) data logging, comprising:
    a plurality of power conditioners, wherein each power conditioner of the plurality of power conditioners is coupled to a power distribution line and comprises a controller for (i) continuously recording data obtained by sampling a waveform of the power distribution line during a sampling window; (ii) analyzing the data to determine whether an event has occurred; and (iii) maintaining the data when it is determined that the event has occurred, and discarding the data when it is determined that the event has not occurred, wherein each power conditioner of the plurality of power conditioners is a DC-AC inverter.

12. The system of claim 11, wherein the sampling window is a rolling window.

13. The system of claim 12, wherein the data comprises (a) data obtained during a time period prior to the event, and (b) data obtained during a time period following the event.

14. The system of claim 11, wherein the controller further stamps the data with identification information.

15. The system of claim 9, wherein the identification information comprises at least one of a time stamp, phase information, or physical location.

16. The system of claim 11, further comprising a distributed generator (DG) controller, communicatively coupled to each power conditioner of the plurality of power conditioners, wherein each power conditioner of the plurality of power conditioners sends the maintained data to the DG controller.

17. The system of claim 16, wherein the DG controller analyzes data received from the plurality of power conditioners to identify a root cause of the event.

* * * * *